Feb. 24, 1959     D. M. DERRICK     2,874,432
DRUM CLAMP

Filed April 11, 1956     3 Sheets-Sheet 1

INVENTOR.
DANIEL M. DERRICK,
BY
W. E. Thibodeau & A. W. Dew
Attorneys.

Feb. 24, 1959

D. M. DERRICK 2,874,432

DRUM CLAMP

Filed April 11, 1956

INVENTOR.
DANIEL M. DERRICK,
BY
W. E. Thibodeau & O. W. Dew
Attorneys

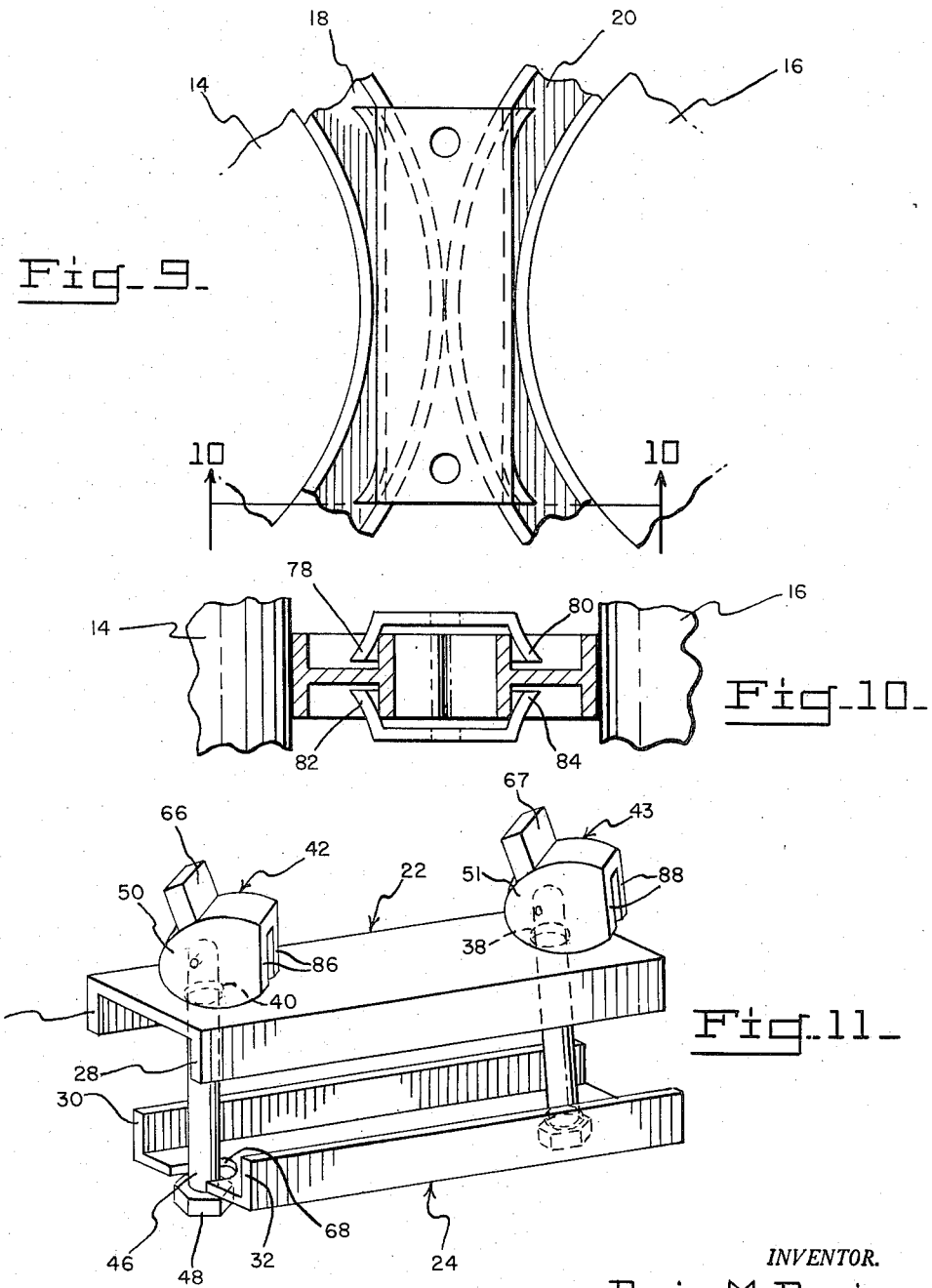

United States Patent Office 2,874,432
Patented Feb. 24, 1959

2,874,432
DRUM CLAMP
Daniel M. Derrick, Chevy Chase, Md.

Application April 11, 1956, Serial No. 577,624

3 Claims. (Cl. 24—81)

(Granted under Title 35, U. S. Code (1952), sec. 266)

The invention described herein may be manufactured and used by and for the Government for governmental purposes without the payment of any royalty thereon.

This invention relates to new and useful improvements in clamps. In particular, this invention is directed to providing a type of clamp that is useful in securing shipping containers in fixed relationship during operation incident to handling and transportation.

In shipping and handling containers adapted to hold spillable contents, it is known practice to assemble a plurality of containers on the floors, decks and platforms of conveyances such as trucks, ships and freight cars, in close relationship. From the movements occasioned by transportation, the containers frequently become disarrayed and are subject to sufficient jostling and jolting to give rise to damage to the containers, and thereby to cause leakage and loss of the contents, as well as possible damage to the conveyance.

In handling containers of cylindrical or barrel shape, the expedient has been resorted to of equipping these containers with external circumferential rings of metal or other desirable material. These rings, of which there may be several which may be welded or otherwise suitably secured to the periphery of the cylinder or drum, may be H-shaped in cross section. These serve as means whereon the containers may be rolled in handling, and serve a useful purpose in minimizing damage to the drums.

However, it has been found that the shifting of the drums that takes place in transportation operations, often is such that the rings do not effectively protect the drum walls from damage, for the reason that the disalignment of the drums permits contact and impact with respect to the container walls. The rings on one drum may override and become lodged on the rings of adjacent drums, in which case the rings as protective devices are of little value.

In consideration of this problem various expedients have been resorted to. Among others the use of clamps has been suggested with the object of maintaining the relative position of the drums, such clamps being designed to engage the ring tracks at the points where same come into abutting relationship.

However, clamps that hitherto have been designed for the purpose have suffered from certain serious disadvantages. Since a considerable number of such clamps are necessary, cost becomes a considerable factor, and clamps of known type are comparatively expensive to manufacture. Also, difficulty has been encountered in operating the hitherto known clamps, due in part to close tolerances found necessary in fitting same to drum tracks, which may not be of uniform size and shape, or which may have become distorted in handling.

It is an object of the present invention to provide clamps of an advanced type, which have improved adaptability under operating conditions. It is also an object of the present invention to provide a type of clamp which will serve within a relatively wide range of ring track contours. It is a further object of the present invention to provide clamps that can readily and rapidly be engaged with and disengaged from the drum ring tracks. Further advantages will become apparent in the course of the following disclosure.

I have found that by providing a clamp having a rectangular shape, disadvantages hitherto encountered can be substantially obviated. Clamps designed in accordance with my invention are not constrained to closely fit the curve of the drum ring tracks. Specifically the clamps, which I will hereinafter disclose, are characterized by having flanges disposed along the opposed parallel edges of a rectangular plate portion. These straight flanges, when my clamps are engaged with the drum ring tracks, have the relationship of chords with respect to the circumference of the tracks. Since they do not conform to the circular track, the exact shape and dimensions of the latter is a less critical factor. Further, the rectangular shape of clamps designed in accordance with my invention facilitates manufacture and reduces manufacturing costs.

While the clamps designed in accordance with my invention, may be in one sense termed loose fitting, the drums may be held securely and as firmly as desired. As will become apparent, following my invention, it is possible to provide a predeterminable degree of clamping action. Particular reference, in the matter of securing a pressure grip, may be had to certain embodiments of my invention hereinafter fully set forth.

For purposes of illustration, reference may be had to the accompanying drawings wherein certain embodiments of my invention are disclosed:

Fig. 9 is a broken away plan view of parts of two drums, showing the H-shaped rings, and a clamp corresponding to a third embodiment of my invention, engaged in clamping position thereon.

Fig. 10 is a sectional view taken on line 10—10 of Fig. 9.

Fig. 11 is a perspective view of a complete clamp corresponding to the embodiment shown in Figs. 2 through 5.

Figure 1:
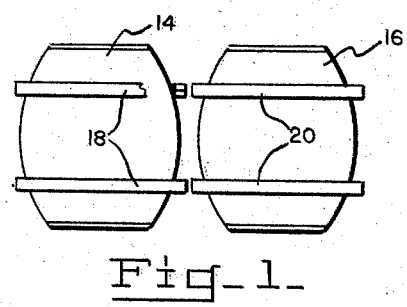
Fig. 1 is an elevational view of two drums, in normally assembled upright position equipped with H-shaped circumferential rings.

In further detail: in Fig. 1, there are shown two barrel shaped containers or drums 14 and 16. Each drum is equipped with rings designated as 18 and 20 respectively, the rings extending circumferentially around the drums, and being H-shaped in cross section. It will be noted that the outer portions of the rings 18 and 20 are thus T-shaped in cross-section.

Referring now to the embodiment of my invention illustrated in Figs. 2 through 5, and 11, it will be seen that the clamp therein shown consists essentially of a pair of clamp members 22 and 24 and fastening means therefor. Member 22 comprises a base plate portion 34 of rectangular shape, having upstanding flanges 26 and 28 disposed along opposite parallel edges of the plate and forming a right angle thereto. The base plate portion of the upper member 22 is provided with holes 38 and 40 adapted to receive fastening members such as that designated as 42. Member 24 is similar to member 22, comprising a base plate portion 36, upstanding flanges 30 and 32, and holes corresponding to those designated as 38 and 40 (as hole 44 in Fig. 5).

The fastening member 42 consists essentially of a shank 46, and terminal heads 48 and 50. For resilient engagement a spring washer 52 may be provided. In the drawings head 48 is shown as being integral with the shank, but it will be understood that this alternatively, may be threaded or otherwise suitably attached to the shank to permit adjustment of the effective length thereof.

A second fastening member is provided, similar to member 42. Attention is invited to Fig. 11, where is shown two such members 42 and 43. It will be understood that the provision of such like fastening members is not exclusive, and that one or both of the members may constitute an ordinary screw threaded bolt. However, I prefer that at least one of the fastening members correspond to the cam bolt illustrated. While the shank may fit as tigthly as desired, I have found it desirable to construct the shank somewhat smaller in diameter than the diameter of the receiving hole to insure a loose and easy fit.

Figure 3:
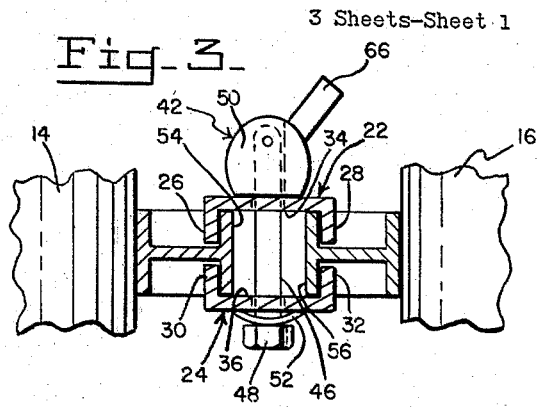
Fig. 3 is a sectional view taken on line 3—3 of Fig. 2.
Figure 4:
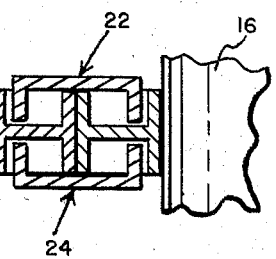
Fig. 4 is a sectional view taken on line 4—4 of Fig. 2.
Figure 2:
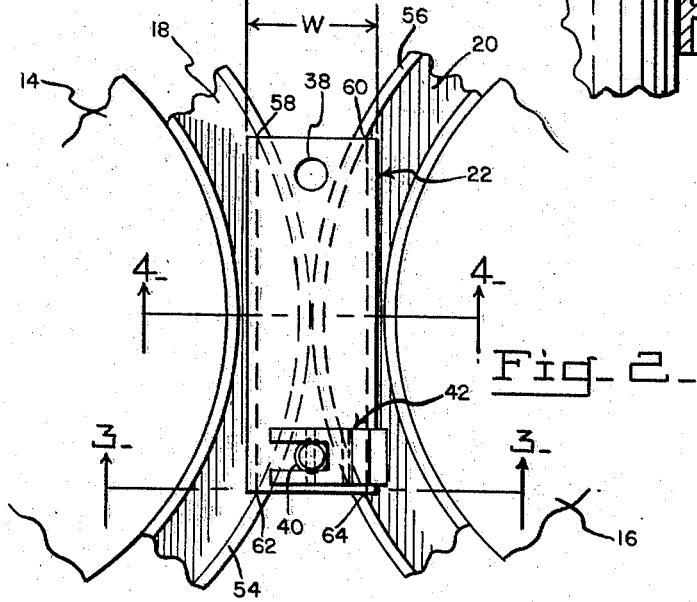
Fig. 2 is a broken away plan view of parts of two drums, showing H-shaped rings and a clamp engaged in clamping position thereupon.
Figure 5:
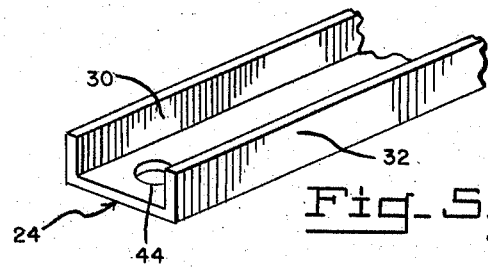
Fig. 5 is a perspective view of one of the clamping members shown in the preceding drawings.

As shown in Figs. 2 and 3, the shape and size of my rectangular clamp members 22 and 24, is such that the drum track flanges 56 and 54 are contacted by the flanges 26, 28, 30 and 32, at four points 58, 60, 62, and 64. While the drawings show the clamp members as contacting the drum track flanges when the latter are in abutting contact (Fig. 2), it will be understood that in actual use, it is not essential that the fit be close, but on the contrary, my invention admits of considerable leeway and tolerance in relative dimensions. It is necessary that the rectangular dimensions of the clamp members, viewed in plan view (Fig. 2) only approximately correspond to that determined by the curve of the drum track flanges. For any particular drum track circumference, the ratio of the dimensions of the respective clamp members is approximately determined by the dimensions of the drum rings whereon the clamp is accommodated. However, due to the structural conformation of the clamp, the so determined relationship need not be, and desirably is not, exact, inasmuch as it is an object of my invention to allow for variation in drum ring contours.

The operation of my clamp is as follows: after the drum rings are brought into contact, the upper and lower members of the clamp are applied respectively to the upper and lower edges of the abutting ring tracks, moved into assembly position, and joined by means of the fastening members. The members are then drawn together and clamped by rotating the cam heads 50 and 51 until the flat surfaces 86 and 88 of cam bolts 42 and 43 are in locking engagement with the surfaces of clamp member 22.

In order to facilitate assembling the clamp members, one or more of the openings 38, 40, 42 and 44 may be in the form of a slot 68 as shown in Fig. 11.

Figure 6:
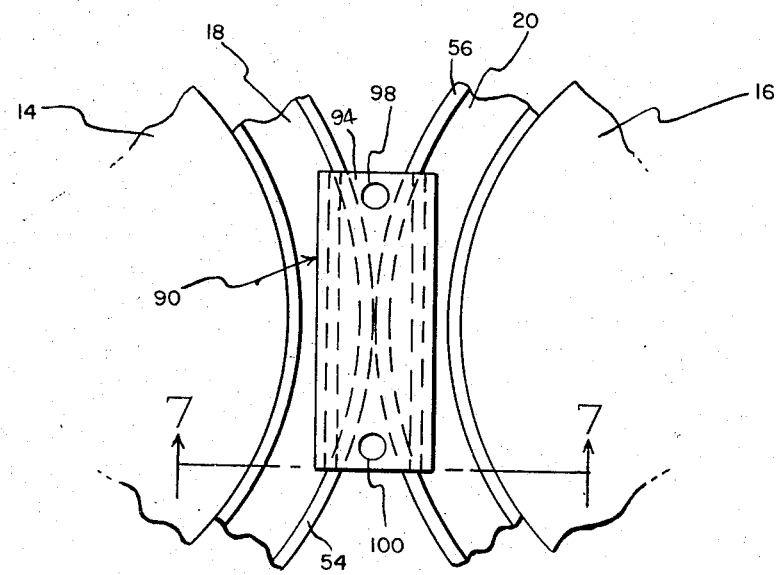
Fig. 6 is a broken away plan view of parts of two drums, showing the H-shaped rings and a clamp corresponding to a second embodiment of my invention, engaged in a clamping position thereupon.
Figure 7:
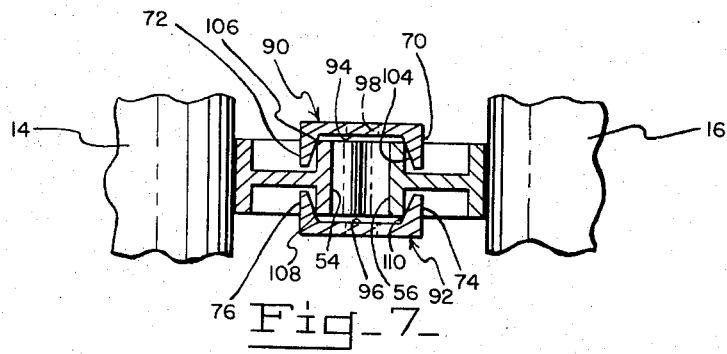
Fig. 7 is a sectional view taken on line 7—7 of Fig. 6.
Figure 8:
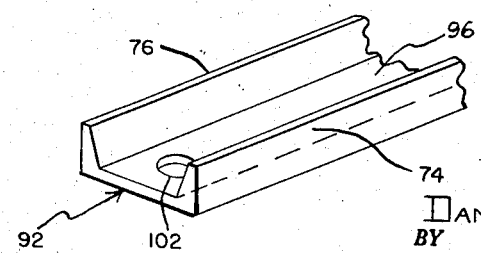
Fig. 8 is a perspective view of one of the clamping members shown in Fig. 6 and Fig. 7.

In Figs. 6 through 8, I have shown a desirable modification of my herein described clamp structure. In this embodiment the side faces of flanges 70, 72, 74 and 76 are characterized by having a taper. As will be understood by reference to Fig. 7, as the clamp members are drawn together, by means of the fastening members, a wedging action is accomplished which brings the ring tracks and member flanges into tight relationship. This embodiment is likewise adaptable to drum rings of varying size and shape.

In this modification, the assembly of the clamp, and the use of same in attaching the drum ring track is similar to that of the preceding embodiment. Two members 90 and 92 are provided, having integral tapered flanges 70, 72, and 74, 76 respectively. The base plate portions 94 and 96 of members 90 and 92 are provided with holes 98, 100 and 102 respectively. A second hole, not shown, is provided in base plate portion 96, matching hole 98 in base plate portion 94.

The members are assembled in the same manner as shown in Fig. 11. When the cam bolts are drawn tight, the inner tapered faces, 104, 106, 108, and 110, exert a camming action on the drum ring track, 54, 56, drawing same together with considerable force.

In Figs. 9 and 10 I have illustrated a third embodiment. In this embodiment, flanges 78, 80, 82 and 84 are provided on the clamp members, which flare outwardly, thereby providing a wedging action comparable to that obtained by means of the embodiment shown in Figs. 6 through 8.

The construction is otherwise similar to the preceding embodiments, and the operation will be understood from the descriptions thereof, above set forth.

In Fig. 11, I have shown a complete clamp assembly corresponding to the embodiment shown in Figs. 1 through 5, except that a slot 68 is provided in place of a hole, to receive the shank 46 of the fastening member 42, for reasons that have been hitherto explained.

As has heretofore been pointed out, the ratio of width to length of the clamp member, will bear a definite relationship to the circumference of the track. In other words, for any given drum track, the clamp may vary in size, but in general, the wider the H-shaped channel beam is made, the longer the clamp must be. A desirable size will be that in which the overall width of clamp member, designated as W will approach the distance between the inner (smaller circumference) track flanges, as shown in Fig. 2, when the outer flanges are in abutting relationship.

It will be understood that the foregoing description is for purposes of illustration, and not of limitation, and what I desire to claim and protect by Letters Patent is as follows:

I claim:

1. A clamp for securing a pair ringed drums against relative movement, said drums having rings carried thereby of T-shaped cross-section at their outer ends and said rings being in adjacent relationship, comprising, in combination, a pair of oppositely disposed identical clamp members, each said clamp member defining a rectangular base plate, said base plate being turned up along opposite parallel edges to define a pair of spaced flanges adapted to engage the inner periphery of said T-shaped rings at four spaced points located at the ends of said flanges and to be spaced from said rings at the intermediate points of said flanges and span the adjacent point thereof, and fastening members connecting said base portions and operative to move said clamp members into locking position with respect to said rings on said drums.

2. A clamp as defined in claim 1 in which the inner walls of each said pair of flanges on each said clamp member taper oppositely and outwardly from their respective base plate portion.

3. A clamp for securing a pair of ringed drums against relative movement, said drums having rings carried thereby of T-shaped cross section at their outer ends comprising, in combination, a pair of oppositely disposed identical clamp members, each said clamp member defining a rectangular base plate having longitudinally spaced openings therein, said base plate being turned up along opposite parallel edges to define a pair of spaced flanges adapted to engage the inner periphery of said T-shaped rings on said drums at four spaced points located at the ends of said flanges and to be spaced from said rings at the intermediate points of said flanges, the inner walls of each said pair of flanges on each said clamp member tapering oppositely and outwardly from their respective base plate portion, and fastening members receivable in said openings in said rectangular base portions comprising a shank having terminal heads, one of said terminal heads being movable to engage a clamp member and move said clamp members into locking position with respect to said rings on said drums whereby said tapered flanges on said clamp members act to draw said rings on said drums into abutting relation.

References Cited in the file of this patent

UNITED STATES PATENTS

| | | |
|---|---|---|
| 1,860,919 | Ansel | May 31, 1932 |
| 2,540,383 | Tillert et al. | Feb. 6, 1951 |
| 2,629,910 | Imparato | Mar. 3, 1953 |
| 2,631,346 | Wengen et al. | Mar. 17, 1953 |
| 2,778,083 | Imparato | Jan. 22, 1957 |